United States Patent
Zhao et al.

(10) Patent No.: US 11,269,746 B1
(45) Date of Patent: Mar. 8, 2022

(54) RECOVERY OF PAGE DESCRIPTION BLOCKS BASED ON CONTEXT

(71) Applicant: EMC IP Holding Company LLC, Hopkinton, MA (US)

(72) Inventors: Edward Zhao, Beijing (CN); Socheavy Heng, Framingham, MA (US); Sihang Xia, Beijing (CN); Xinlei Xu, Beijing (CN); Vamsi K. Vankamamidi, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/156,030

(22) Filed: Jan. 22, 2021

(51) Int. Cl.
  *G06F 11/08* (2006.01)
  *G06F 11/20* (2006.01)
  *G06F 12/06* (2006.01)

(52) U.S. Cl.
  CPC .......... *G06F 11/2094* (2013.01); *G06F 12/06* (2013.01); *G06F 2201/82* (2013.01); *G06F 2212/1032* (2013.01)

(58) Field of Classification Search
  CPC .......................... G06F 11/2056; G06F 11/2094
  USPC .......................................... 714/6.1, 6.12, 15
  See application file for complete search history.

(56) References Cited

U.S. PATENT DOCUMENTS

| | | | | |
|---|---|---|---|---|
| 4,658,351 | A * | 4/1987 | Teng ...................... | G06F 9/4881 718/103 |
| 2009/0276586 | A1 * | 11/2009 | Royer ................. | G06F 12/0246 711/154 |
| 2010/0106753 | A1 * | 4/2010 | Prabhakaran ........... | G06F 3/065 707/818 |
| 2010/0217921 | A1 * | 8/2010 | Mun ................... | G06F 11/1072 711/103 |
| 2018/0365141 | A1 * | 12/2018 | Dragojevic ......... | G06F 12/0246 |
| 2020/0349072 | A1 * | 11/2020 | Fliess .................. | G06F 12/0804 |
| 2020/0364105 | A1 * | 11/2020 | Carey ................. | G06F 16/1727 |

FOREIGN PATENT DOCUMENTS

WO WO-2015116125 A1 * 8/2015 ............. G06F 16/10

* cited by examiner

*Primary Examiner* — Chae M Ko
(74) *Attorney, Agent, or Firm* — BainwoodHuang

(57) ABSTRACT

A method performed by a computing device having memory is provided. The method includes (a) detecting corruption in a first page description block (PDB) of a plurality of PDBs stored in sequence in the memory, each PDB storing a set of page descriptors (PDs) that point to pages of data sequentially stored in the memory that are part of a single transaction, PDBs that represent the same transaction being contiguous within the sequence; (b) searching for a second PDB of the plurality of PDBs, the second PDB satisfying the following criteria: (1) it is not corrupted, and (2) it represents a same transaction as the first PDB; and (c) reconstructing the first PDB using the second PDB. An apparatus, system, and computer program product for performing a similar method are also provided.

20 Claims, 5 Drawing Sheets

RECOVERY OF PAGE DESCRIPTION BLOCKS BASED ON CONTEXT

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems include a high-speed non-volatile cache into which all writes are persisted upon receipt in order to ensure that the writes are secured against power failure even when the system operates in a write-back mode. Write-back mode allows writes to be acknowledged prior to being completed. These systems acknowledge writes once they are stored in the high-speed non-volatile cache.

SUMMARY

Upon a power failure or crash of a storage system, the high-speed non-volatile cache must be read back into system memory so that the cached operations can be performed. However, in the event that there is an error within a cached write operation as stored within the high-speed non-volatile cache, that write operation may be irretrievably lost. This can be particularly detrimental if the lost write operation included a loss of metadata.

Some storage systems utilize a set of ring buffers for arranging the high-speed non-volatile cache. Thus, there may be an organizational ring buffer that identifies transactions as well as locations in one or more data ring buffers where the data of those transactions are cached. If a data sector of the organizational ring buffer is corrupted, then the entire transaction which it represents may be lost unless that data sector can be recovered. In some cases it may be possible to recover the sector using error-correcting code memory or by obtaining an uncorrupted copy of the data from memory of a peer. However, when that is not possible, data loss occurs.

Thus, it would be desirable to operate a storage system to recover a corrupted data unit, such as a sector, in the organizational ring buffer using redundancies present in other data sectors of the same transaction. This may be accomplished by searching for another data sector within the organizational ring buffer that contains sufficient information to allow the corrupted sector to be recovered and then reconstructing the corrupted sector using that other sector. It should be understood that although described in the context of a data storage system, such techniques can also be used in other contexts provided that a similarly-structured cache is in use.

In one embodiment, a method performed by a computing device having memory is provided. The method includes (a) detecting corruption in a first page description block (PDB) of a plurality of PDBs stored in sequence in the memory, each PDB storing a set of page descriptors (PDs) that point to pages of data sequentially stored in the memory that are part of a single transaction, PDBs that represent the same transaction being contiguous within the sequence; (b) searching for a second PDB of the plurality of PDBs, the second PDB satisfying the following criteria: (1) it is not corrupted, and (2) it represents a same transaction as the first PDB; and (c) reconstructing the first PDB using the second PDB. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for operating a storage system to recover a corrupted data unit, such as a sector, in the organizational ring buffer using redundancies present in other data sectors of the same transaction. This may be accomplished by searching for another data sector within the organizational ring buffer that contains sufficient information to allow the corrupted sector to be recovered and then reconstructing the corrupted sector using that other sector. It should be understood that although described in the context of a data storage system, such techniques can also be used in other contexts provided that a similarly-structured cache is in use.

Figure 1:
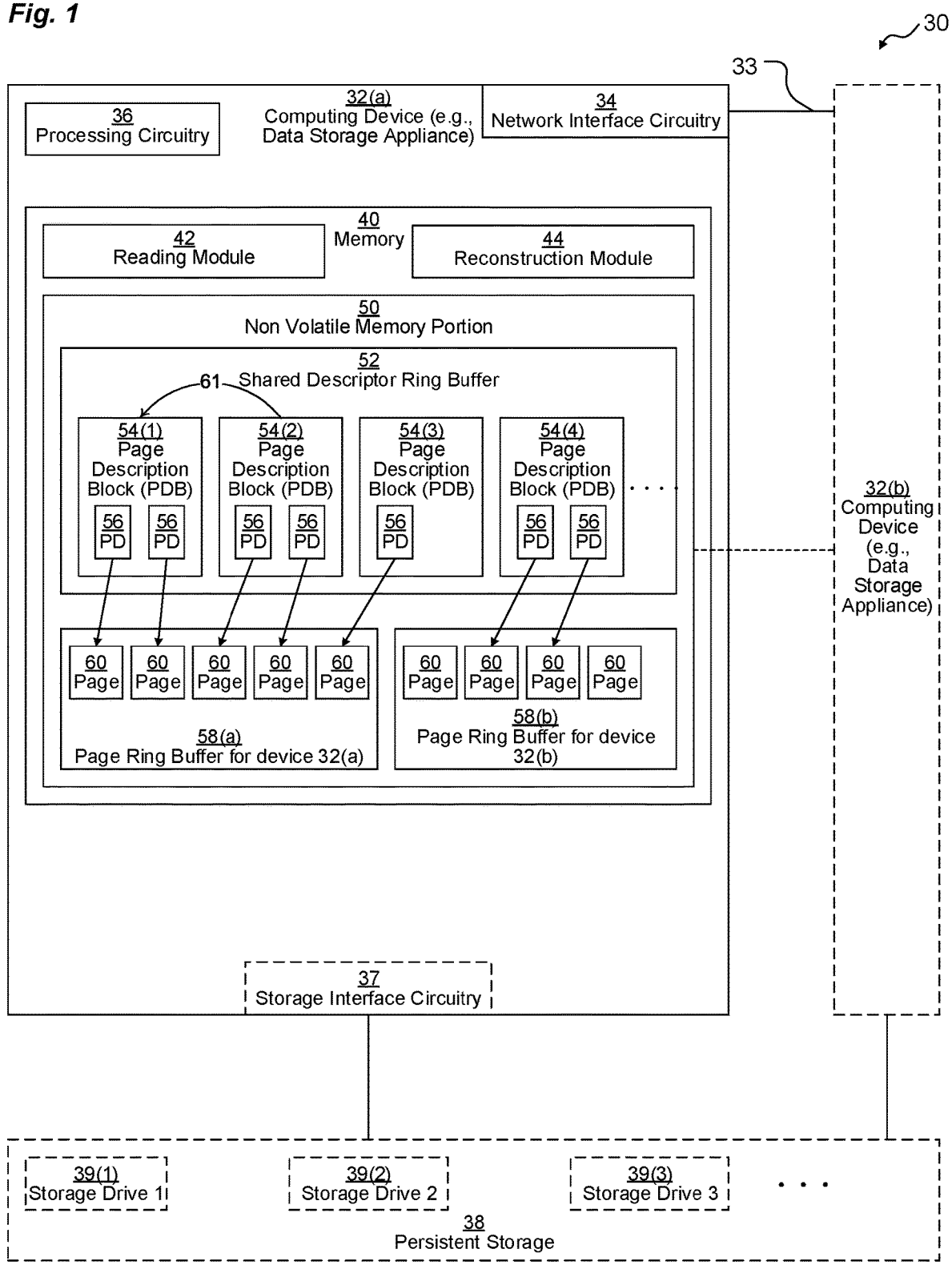
FIG. 1 is a block diagram depicting an example system, apparatus, and data structure arrangement for use in connection with various embodiments.

FIG. 1 depicts an example environment 30 for use in connection with various embodiments. Environment 30 includes a computing device 32(*a*). In an example embodiment, computing device 32(*a*) may be a data storage appliance configured to provide access to persistent storage 38. In some embodiments, computing device 32(*a*) is communicatively coupled to another computing device 32(*b*) across a network connection 33.

Computing device 32(*a*) may be any kind of computing device, such as, for example, a personal computer, workstation, server computer, enterprise server, data storage array device, laptop computer, tablet computer, smart phone, mobile computer, etc.

Computing device 32(a) may include network interface circuitry 34, processing circuitry 36, Storage interface circuitry 37, and memory 40. Computing device 32(a) may connect to a network 33 using network interface circuitry 34.

Processing circuitry 36 may include any kind of processor or set of processors configured to perform operations, such as, for example, a microprocessor, a multi-core microprocessor, a digital signal processor, a system on a chip (SoC), a collection of electronic circuits, a similar kind of controller, or any combination of the above.

Storage interface circuitry 37 controls and provides access to persistent storage 38. Storage interface circuitry 37 may include, for example, SCSI, SAS, ATA, SATA, FC, M.2, U.2, and/or other similar controllers and ports. Persistent storage 38 includes a plurality of non-transitory persistent storage drives 39 (depicted as storage drives 39(1), 29(2), 39(3), . . . ), such as, for example, hard disk drives, solid-state storage devices (SSDs), flash drives, etc.

Network interface circuitry 34 may include one or more Ethernet cards, cellular modems, Fibre Channel (FC) adapters, InfiniBand adapters, wireless networking adapters (e.g., Wi-Fi), and/or other devices for connecting to a network 33, such as, for example, a LAN, WAN, SAN, the Internet, a wireless communication network, a virtual network, a fabric of interconnected switches, etc.

Memory 40 may include any kind of digital system memory, such as, for example, random access memory (RAM). Memory 40 stores an operating system (OS) (not depicted) and various drivers (e.g., storage drivers, not depicted) in operation (e.g., a Linux, UNIX, Windows, MacOS, or similar operating system). Memory 40 also stores a reading module 42, a reconstruction module 44, and other software modules (not depicted) which each execute on processing circuitry 36.

In some embodiments, memory 40 includes a portion 50 of non-volatile memory, such as, for example, a high-speed cache. Non-volatile memory portion 50 may include, for example, Intel Optane memory, a high-speed SSD drive, etc. In some embodiments, non-volatile memory portion 50 may be shared or mirrored with the other computing device 32(b).

Memory 40, typically within non-volatile memory portion 50, includes a shared descriptor ring buffer 52 and a set of (typically two) page ring buffers 58 (depicted as page ring buffers 58(a), 58(b)). As depicted, each shared ring buffer 52 is shared between the computing devices 32(a), 32(b), while each page ring buffer 58(a), 58(b) may be associated with a respective computing device 32(a), 32(b), respectively.

Shared descriptor ring buffer 52 includes a plurality of page description blocks (PDB) 54 (depicted as page description blocks 54(1), 54(2), 54(3), 54(4), . . . ). A PDB 54 may be, for example, a 512-byte sector of memory. Each PDB 54 includes one or more page descriptors (PDs) 56, and each PD 56 points to a particular page 60 of memory within one of the page ring buffers 58. In some embodiments, these pages 60 represent cached data to be written to long-term persistent storage 38 as parts of transactions. The PDs 56 within a single PDB 54 all represent a same transaction, and a single transaction may be represented by one or more PDBs 54.

In some embodiments, after computing device 32(a) restarts (whether due to a power failure or due to a crash, for example), reading module 42 reads the shared descriptor ring buffer 52 and the page ring buffers 58 from the non-volatile memory portion 50 into a volatile portion of memory 40, so that the transactions represented by the PDBs 54 can be persisted by processing circuitry 36 to persistent storage 38 from system memory.

As depicted, while reading module 42 reads the contents of the non-volatile memory portion 50, an error is encountered, and PDB 54(1) is deemed to be corrupt. The, reconstruction module 44 operates to search for another PDB 54 (e.g., PDB 54(2)) that represents a same transaction and which it is able to use in a recovery operation 61 to reconstruct PDB 54(1).

Memory 40 may also store various other data structures used by the OS, modules 42, 44, and various other applications and drivers. In some embodiments, memory 40 may also include a persistent storage portion. Persistent storage portion of memory 40 may be made up of one or more persistent storage devices, such as, for example, magnetic disks, flash drives, solid-state storage drives, or other types of storage drives. Persistent storage portion of memory 40 or persistent storage 38 is configured to store programs and data even while the computing device 32(a) is powered off. The OS, modules 42, 44, and various other applications and drivers are typically stored in this persistent storage portion of memory 40 or on persistent storage 38 so that they may be loaded into a system portion of memory 40 upon a system restart or as needed. The OS, modules 42, 44, and various other applications and drivers, when stored in non-transitory form either in the volatile portion of memory 40, or on persistent storage 38 or in persistent portion of memory 40, each form a computer program product. The processing circuitry 36 running one or more applications thus forms a specialized circuit constructed and arranged to carry out the various processes described herein.

Figure 2:
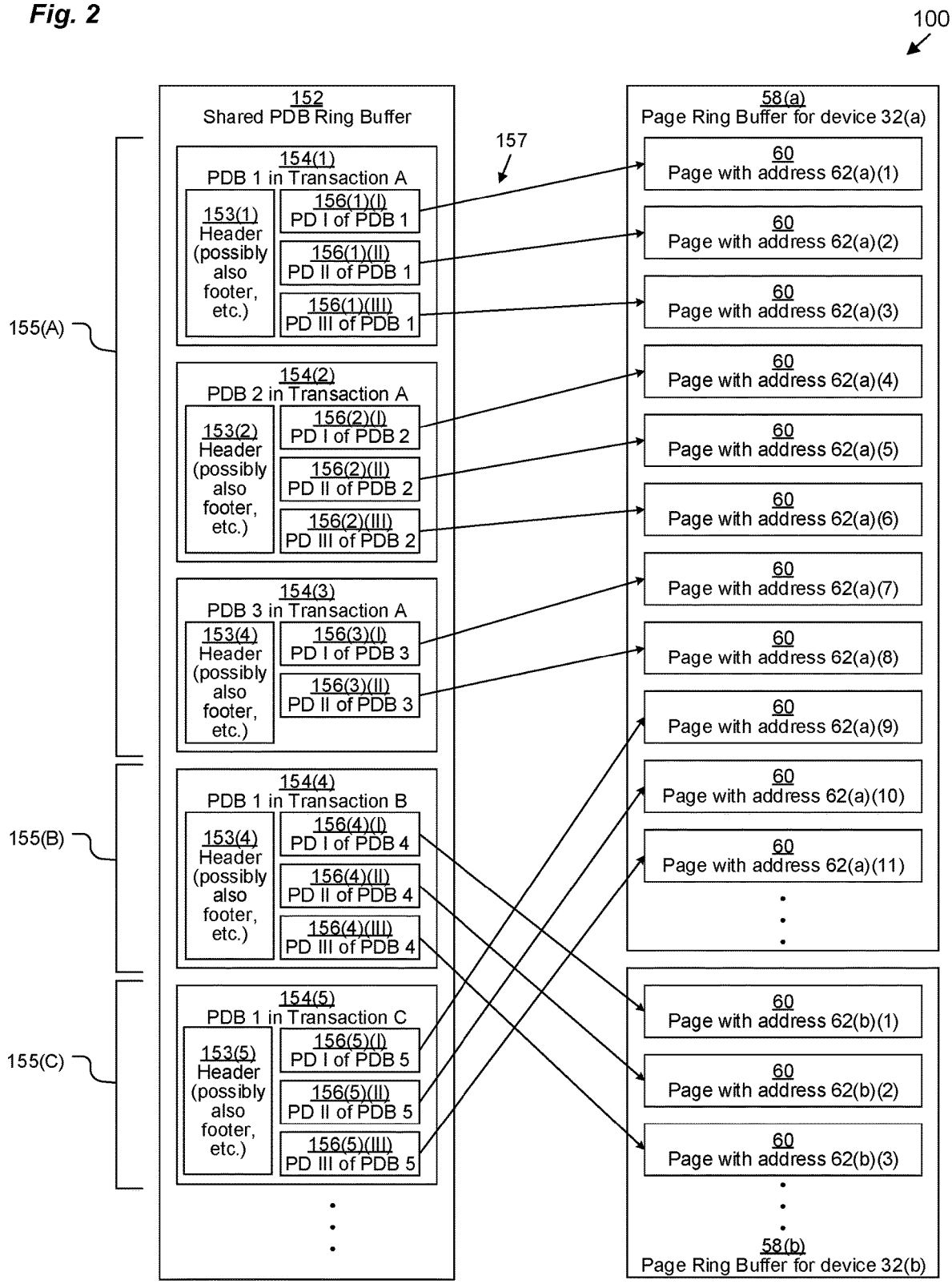
FIG. 2 is a block diagram depicting an example data structure arrangement for use in connection with various embodiments.

FIG. 2 illustrates an example arrangement 100 of a shared PDB ring buffer 152 and page ring buffers 58(a), 58(b) as stored within non-volatile memory portion 50. Shared PDB ring buffer 152 includes a plurality of sequentially-arranged PDBs 154. Shared PDB ring buffer 152 may also include a head pointer and a tail pointer (not depicted) as is well-known in the art.

Each PDB 154 includes a set of PDs 156 and a header 153. In some embodiments, instead of or in addition to a header 153, PDBs 154 may also include a footer (not depicted) or other data interspersed between the PDs 156 (not depicted). Each PDB 154 may contain up to a maximum number of PDs 156. In one example embodiment, as depicted, the maximum number of PDs 156 per PDB 154 is three. Each PD 156 points (e.g., by including an offset 157) to a particular page 60 within a page ring buffer 58. The PDs 156 within each PDB 154 all point to sequential pages 60 within a single page ring buffer 58. Thus, PDs 156(1)(I), 156(1)(II), 156(1)(III) of PDB 154(1) point to pages 60 within page ring buffer 58(a) with addresses (or offsets) 60(a)(1), 60(a)(2), 60(a)(3) which are all located sequentially within page ring buffer 58(a), as depicted. Similarly, PDs 156(2)(I), 156(2)(11), 156(2)(111) of PDB 154(2) point to pages 60 within page ring buffer 58(a) with addresses (or offsets) 60(a)(4), 60(a)(5), 60(a)(6) which are all located sequentially within page ring buffer 58(a), as depicted, and PDs 156(3)(I), 156(3)(II) of PDB 154(3) point to pages 60 within page ring buffer 58(a) with addresses (or offsets) 60(a)(7), 60(a)(8) which are all located sequentially within page ring buffer 58(a), as depicted. PDBs 154(1), 154(2), 154(3) all represent a single transaction 155(A). Transaction 155(A) involves writing eight pages 60 (located at addresses 62(a)(1) through 62(a)(8) of page ring buffer 58(a)). Since the PDBs 154(1), 154(2), 154(3) of transaction 155(A) point to pages 60 stored in page ring buffer 58(a), the transaction 155(A) is processed by computing device 32(a). It should be noted that if a transaction 155 includes more than one PDB 154 (such as transaction 155(A), which includes PDBs 154(1), 154(2), 154(3)), then all PDBs 154 of that transaction 155 include the maximum number (e.g., three) of PDs 156 except the last PDB of that transaction (e.g., PDB 154(3)), which may either contain the maximum number or fewer than the maximum number of PDs 154.

The next PDB 154(4) within the sequence of shared PDB page ring buffer 152, as depicted, represents a transaction 155(B) that belongs to computing device 32(b), so its PDs 156(4)(I), 156(4)(II), 156(4)(III) point to pages 60 within page ring buffer 58(b).

The next PDB 154(5) within the sequence of shared PDB page ring buffer 152, as depicted, represents a transaction 155(C) that belongs to computing device 32(a), so its PDs 156(5)(I), 156(5)(II), 156(5)(III) point to pages 60 within page ring buffer 58(a). Since PDB 154(5) is the next PDB 154 sequentially after PDB 154(3) that is associated with computing device 32(a), its first PD 156(5)(I) points to the next page 60 (with address 62(a)(9)) in page ring buffer 58(a) sequentially right after the last page 60 (with address 62(a)(8)) pointed to by PD 156(3)(II) of PDB 154(3).

Figure 3:
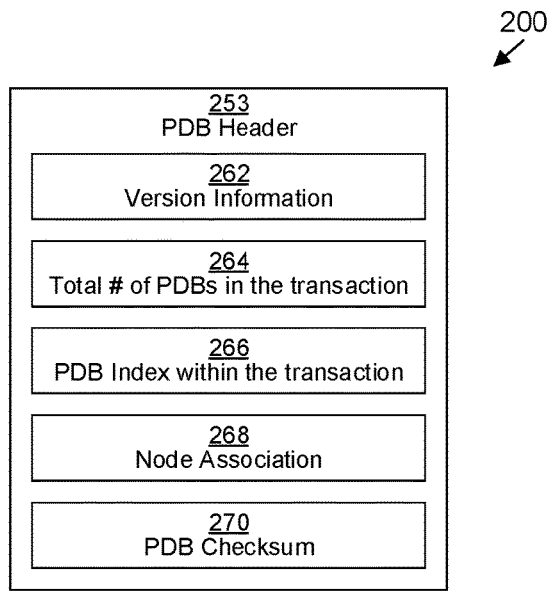
FIG. 3 is a block diagram depicting an example data structure arrangement for use in connection with various embodiments.

FIG. 3 illustrates an example arrangement 200 of a PDB header 253. As depicted, PDB header 253 includes version information 262, a total number 264 of PDBs 154 in the same transaction 155 as the current PDB 154, an index 266 of the current PDB 154 within the transaction 155 (also referred to as a "PDB index 266"), an association 268 with a particular node 32(a), 32(b) (i.e., indicating whether it relates to page ring buffer 58(a) or page ring buffer 58(b)), and a checksum of the PDB 154. It should be understood that this arrangement 200 is by way of example only. There may be additional elements included within PDB header 253 that are not depicted, the elements may be arranged in a different order, or some of the depicted elements may be missing.

With reference back to FIG. 2, headers 153(1), 153(2), 153(3) would all include a total number 264 of three because there are three PDBs 154(1), 154(2), 154(3) that are included in the same transaction 155(A). Header 153(1) would include a PDB index 266 of one because PDB 154(1) is the first PDB 154 in sequence of the transaction 155(A), while header 153(2) would include a PDB index 266 of two, and header 153(3) would include a PDB index 266 of three.

Headers 153(4), 153(5) would both include a total number 264 of one because there is only one PDB 154(4), 154(5) that is included in the same transaction 155(B), 155(C), respectively. Header 153(4) would include a PDB index 266 of one because PDB 154(4) is the first (and only) PDB 154 in sequence of the transaction 155(B). Similarly, header 153(5) would include a PDB index 266 of one because PDB 154(5) is the first (and only) PDB 154 in sequence of the transaction 155(C).

Figure 4:
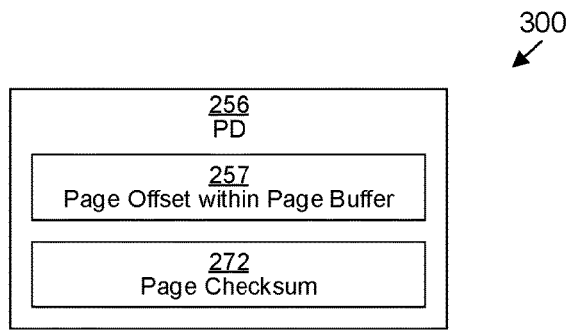
FIG. 4 is a block diagram depicting an example data structure arrangement for use in connection with various embodiments.

FIG. 4 illustrates an example arrangement 300 of a PD 256. As depicted, PD 256 includes an offset 257 of a page 60 within a page ring buffer 58 as well as a checksum 272 of that page 60. It should be understood that this arrangement 300 is by way of example only. There may be additional elements included within PD 256 that are not depicted, the elements may be arranged in a different order, or some of the depicted elements may be missing.

With reference back to FIG. 2, PD 156(1)(I) would include an offset 257 of 62(a)(1), PD 156(1)(I) would include an offset 257 of 62(a)(2), and PD 156(1)(I) would include an offset 257 of 62(a)(3).

Figure 5:
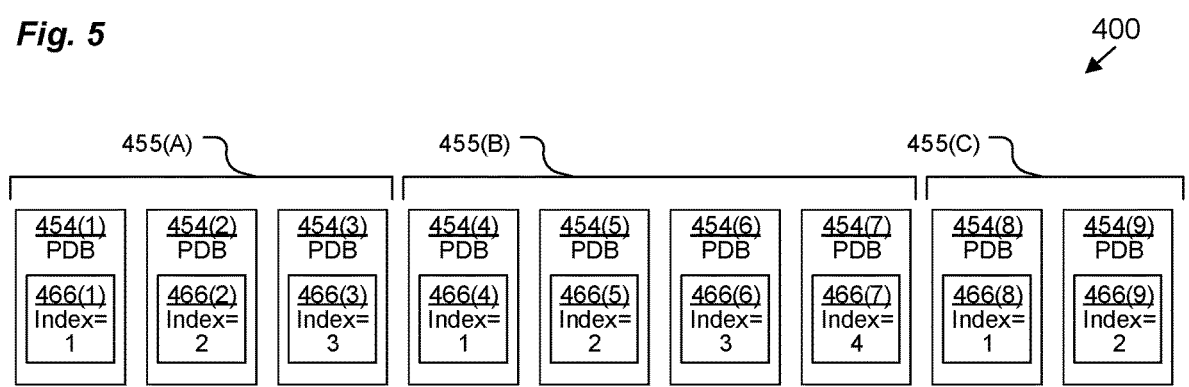
FIG. 5 is a block diagram depicting an example data structure arrangement for use in connection with various embodiments.

FIG. 5 depicts an example arrangement 400 of a PDB ring buffer 52. In arrangement 400, there are three transactions 455(A), 455(B), 455(C) represented. Transaction 455(A) includes the first three PDBs 454(1), 454(2), 454(3), respectively having PDB indices 466(1)-1, 466(2)=2, 466(3)=3. Transaction 455(B) includes the next four PDBs 454(4), 454(5), 454(6), 454(7), respectively having PDB indices 466(4)=1, 466(5)=2, 466(6)=3, 466(7)=4. Transaction 455 (C) includes the last two PDBs 454(8), 454(9), respectively having PDB indices 466(8)=1, 466(9)=2.

Figure 6:
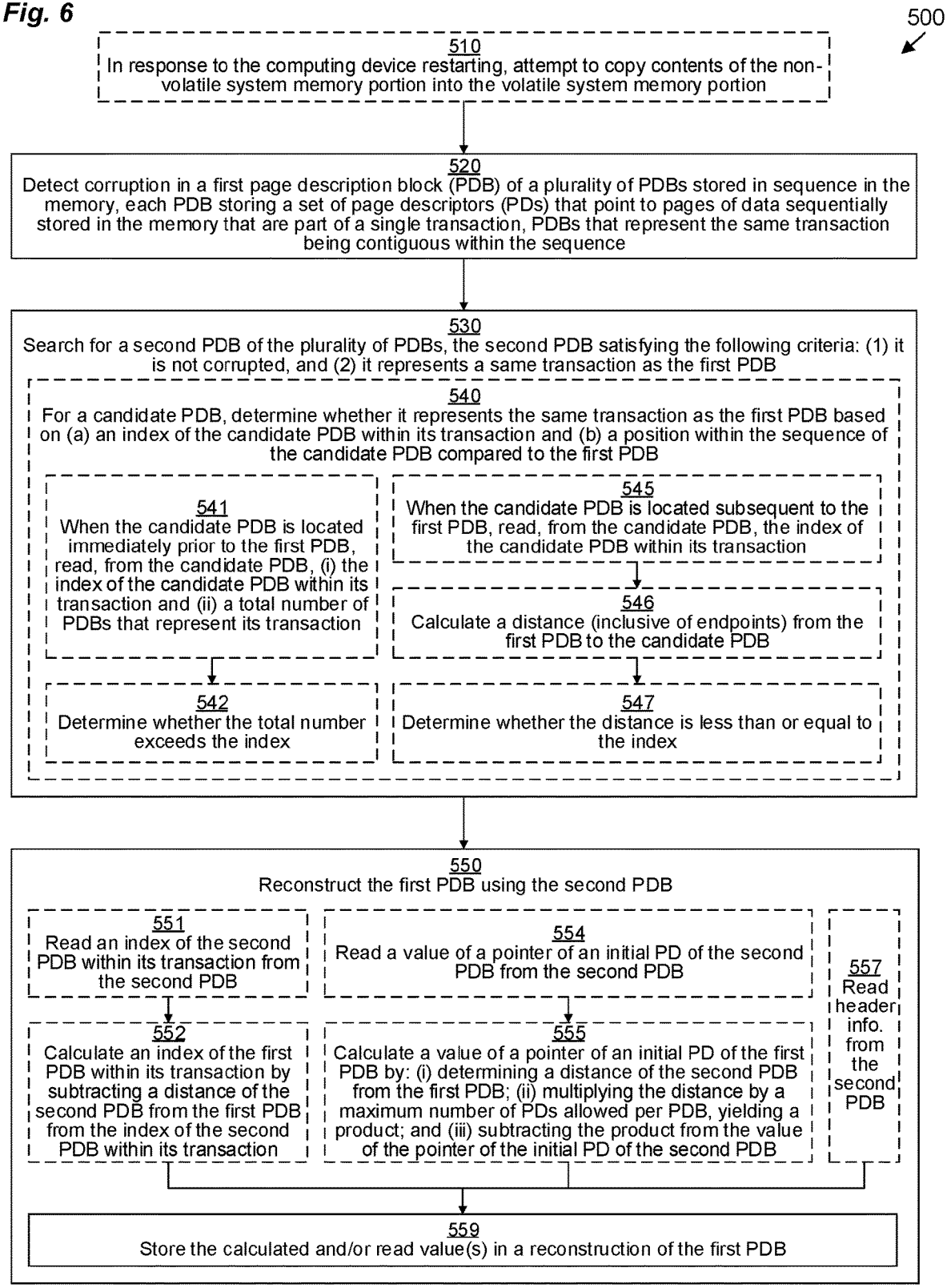
FIG. 6 is a flowchart depicting an example procedure according to various embodiments.

FIG. 6 illustrates an example method 500 performed by computing device 32(a). It should be understood that any time a piece of software (e.g., OS, modules 42, 44, etc.) is described as performing a method, process, step, or function, what is meant is that a computing device (e.g., computing device 32(a)) on which that piece of software is running performs the method, process, step, or function when executing that piece of software on its processing circuitry 36. It should be understood that one or more of the steps or sub-steps of method 500 may be omitted in some embodiments. Similarly, in some embodiments, one or more steps or sub-steps may be combined together or performed in a different order. Dashed lines indicate that a step or sub-step is either optional or representative of alternate embodiments or use cases.

In some embodiments, method 500 is a method of recovering from a power failure or crash of computing device 32(a). In these embodiments, method 500 begins with step 510, in which, in response to the computing device 32(a) restarting, reading module 42 attempts to copy the contents of the non-volatile system memory portion 50 into the volatile system memory portion of memory 40 so that computing device 32(a) can fulfill the transactions 155 stored therein.

In step 520, computing device 32(a) (e.g., reading module 42) detects corruption in a first PDB 54(X) of a plurality of PDBs 54 stored in sequence in memory 40 (e.g., within volatile system memory portion 50), each PDB 54 storing a set of PDs 56 that point to pages 60 of data sequentially stored in the memory 40 (e.g., within non-volatile system memory portion 50) that are part of a single transaction 155, PDBs 54 that represent the same transaction 155 being contiguous within the sequence.

In step 530, reconstruction module 44 searches for a second PDB 54(Y) of the plurality of PDBs 54, the second PDB 54(Y) satisfying the following criteria: (1) it is not corrupted, and (2) it represents a same transaction 155 as does the first PDB 54(X). In some embodiments, step 530 includes sub-step 540. In sub-step 540, for a candidate PDB 54(Q), reconstruction module 44 determines whether it 54(Q) represents the same transaction 155 as the first PDB 54(X) based on (a) a PDB index 266 of the candidate PDB 54(Q) and (b) a position within the sequence of the candidate PDB 54(Q) compared to the first PDB 54(X). If so, candidate PDB 54(Q) may become second PDB 54(Y). Sub-step 540 may be illustrated either by sub-steps 541-542 or by sub-steps 545-547, depending on the context.

When the candidate PDB 54(Q) is located immediately prior to the first PDB 54(X), then, in sub-step 541, reconstruction module 44 reads, from the candidate PDB 54(Q), (i) the PDB index 266 of the candidate PDB 54(Q) and (ii) a total number 264 of PDBs 54 that represent its transaction 155. Then, in sub-step 542, reconstruction module 44 determines whether the total number 264 exceeds the PDB index 266. For example, with reference to FIG. 5, if the first PDB 54(X) is PDB 454(4) and the candidate PDB 54(Q) is the immediately prior PDB 454(3), then since the total number 264 for candidate PDB 454(3) is 3 and the PDB index 466(3) is also 3, the total number 264 does not exceed the PDB index 466(3), which means that candidate PDB 454(3) is not part of the same transaction 455(B) as is the first PDB 454(4).

As another example, again with reference to FIG. 5, if the first PDB 54(X) is PDB 454(5) and the candidate PDB 54(Q) is the immediately prior PDB 454(4), then since the total number 264 for candidate PDB 454(4) is 4 and the PDB index 466(4) is 1, the total number 264 exceeds the PDB index 466(4), which means that candidate PDB 454(4) is part of the same transaction 455(B) as is the first PDB 454(4).

As another example, again with reference to FIG. 5, if the first PDB 54(X) is PDB 454(3) and the candidate PDB 54(Q) is the immediately prior PDB 454(2), then since the total number 264 for candidate PDB 454(2) is 3 and the PDB index 466(2) is 2, the total number 264 exceeds the PDB index 466(2). Thus, candidate PDB 454(2) is part of the same transaction 455(A) as is the first PDB 454(3), however, this represents an exception not depicted in FIG. 6. Since the total number 264 (i.e., 3) exceeds the PDB index 466(2) (i.e., 2) by exactly 1, that means that the first PDB 454(3) is the last PDB 454 within its transaction 455(A). Because the number of PDs 56 within the last PDB 54 of a transaction 155 may vary, it is not possible to reconstruct the first PDB 454(3) using context.

When the candidate PDB 54(Q) is located subsequent to the first PDB 54(X) in sequence, then, in sub-step 545, reconstruction module 44 reads, from the candidate PDB 54(Q), the PDB index 266 of the candidate PDB 54(Q). Then, in sub-step 546, reconstruction module 44 calculates a distance (inclusive of endpoints, hereinafter referred to as an "inclusive distance") from the first PDB 54(X) to the candidate PDB 54(Q). Then, in sub-step 547, reconstruction module 44 determines whether the inclusive distance is less than or equal to the PDB index 266 of the candidate PDB 54(Q). The inclusive distance (inclusive of endpoints) is defined to be the total number of PDBs 54 traversed starting with the first PDB 54(X) and ending with the candidate PDB 54(Q), unless the candidate PDB 54(Q) is prior to the first PDB 54(X), in which case the inclusive distance is zero.

For example, with reference to FIG. 5, if the first PDB 54(X) is PDB 454(4) and the candidate PDB 54(Q) is the immediately subsequent PDB 454(5), then the inclusive distance (inclusive of endpoints) is 2 because traversing from first PDB 454(4) through candidate PDB 454(5) covers two PDBs 454(4), 454(5). Since the inclusive distance of 2 is less than or equal to the PDB index 466(5)=2, candidate PDB 454(5) is part of the same transaction 455(B) as is the first PDB 454(4).

As another example, again with reference to FIG. 5, if the first PDB 54(X) is PDB 454(5) and the candidate PDB 54(Q) is subsequent PDB 454(8), then the inclusive distance (inclusive of endpoints) is 4 because traversing from first PDB 454(5) through candidate PDB 454(8) covers four PDBs 454(5), 454(6), 454(7), 454(8). Since the inclusive distance of 4 is greater than the PDB index 466(8)=1, candidate PDB 454(8) is not part of the same transaction 455(B) as is the first PDB 454(5).

Figure 7:
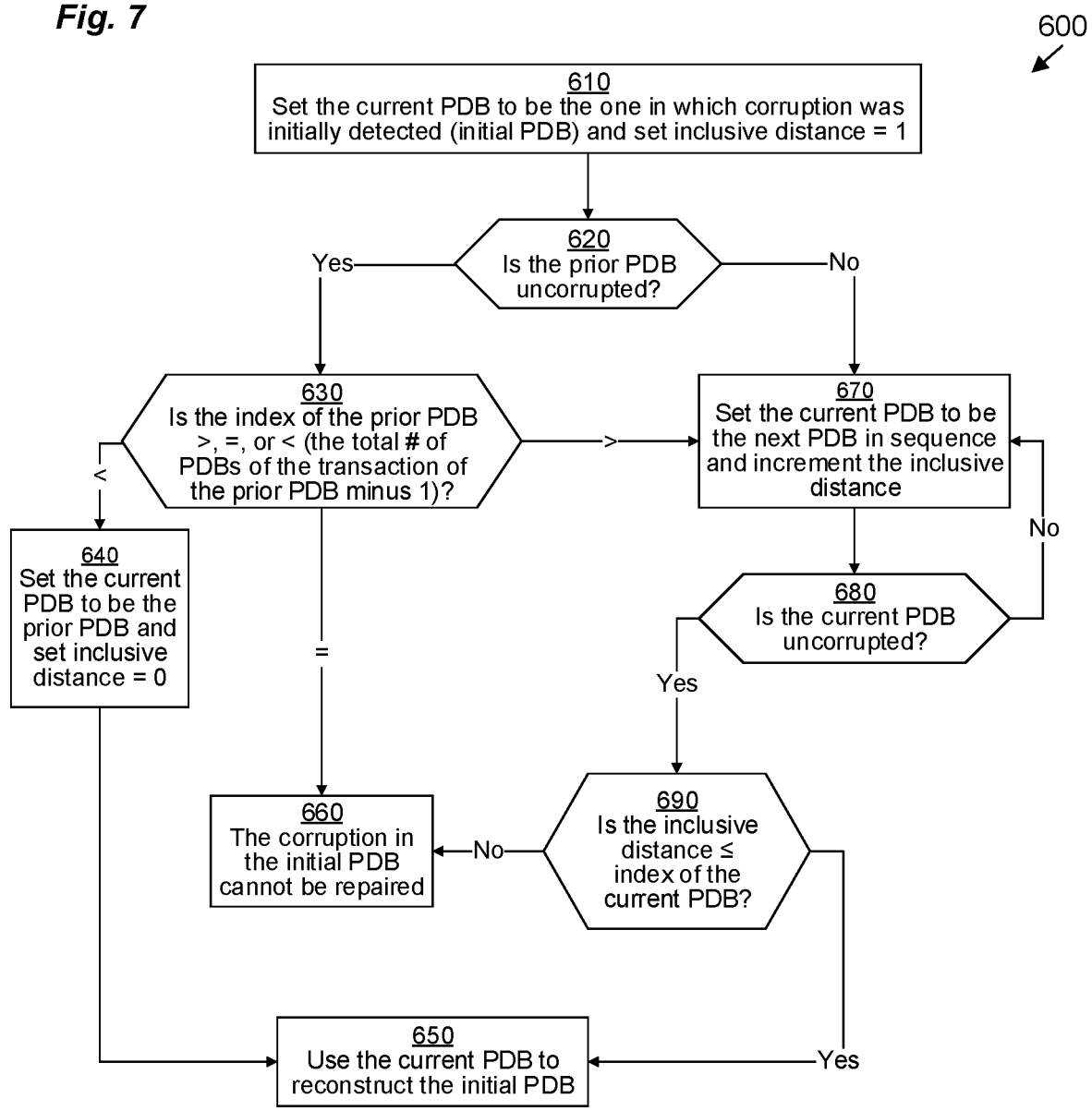
FIG. 7 is a flowchart depicting an example procedure according to various embodiments.

It should be understood that sub-step 540 may be repeated with different candidate PDBs 54(Q) until a successful result is obtained or until it is clear that no successful result is possible. In some embodiments, step 530 may be implemented by method 700 of FIG. 7.

Method 700 begins at step 610, in which reconstruction module 44 sets a current PDB 54(Q) to be the first PDB 54(X) at which the corruption was initially detected in step 520 of FIG. 6. In addition, reconstruction module 44 sets the inclusive distance to be one. Then, in step 620, reconstruction module 44 checks whether the immediately prior PDB 54(X−1) is uncorrupted. If so, then operation proceeds with step 630; otherwise, operation proceeds with step 670.

In step 630, reconstruction module 44 checks whether the PDB index 466(X−1) of the immediately prior PDB 54(X−1) is less than, equal to, or greater than the total number 264 read from the immediately prior PDB 54(X−1) minus 1. If it is less, then operation proceeds with step 640; if it is equal, then operation proceeds with step 660; if it is greater, then operation proceeds with step 670. For example, with reference to FIG. 5, if the initial PDB 54(X) is 454(6), then since the PDB index 466(5)=2<4−1, operation proceeds with step 640. Also with reference to FIG. 5, if the initial PDB 54(X) is 454(7), then since the PDB index 466(6)=3=4−1, operation proceeds with step 660. Also with reference to FIG. 5, if the initial PDB 54(X) is 454(8), then since the PDB index 466(7)=4>4−1, operation proceeds with step 670.

In step 640, reconstruction module 44 sets the current PDB 54(Q) to be the immediately prior PDB 54(X−1) and sets the inclusive distance to be zero. Then, in step 650, reconstruction module 44 uses the current PDB 54(X−1) (and the inclusive distance of zero) as the second PDB 54(Y) to reconstruct the initial PDB 54(X) (see step 550 of FIG. 6, discussed below).

In step 660, reconstruction module 44 determines that the corruption in the initial PDB 54(X) cannot be repaired, so method 600 fails to succeed.

In step 670, which is performed if either the immediately prior PDB 54(X−1) is corrupted (negative result from step 620) or the immediately prior PDB 54(X−1) is the last PDB 54 in its transaction 155 (>result from step 630), reconstruction module 44 sets the current PDB 54(Q) to be next PDB 54(Q+1) and increments the inclusive distance by one. Then, in step 680, reconstruction module 44 checks whether the current PDB 54(Q) is uncorrupted. If not, operation loops back to step 670; otherwise, operation proceeds with step 690.

In step 690, reconstruction module 44 checks whether the inclusive distance is less than or equal to the PDB index 466(Q) of the current PDB 54(Q). If so, then operation proceeds successfully with step 650; otherwise, operation proceeds with step 660, resulting in failure.

Returning back to FIG. 6, after step 540, in step 550, reconstruction module 44 reconstructs the first PDB 54(X) using the second PDB 54(Y) (i.e., candidate PDB 54(Q) from step 530 if successful). Depending on the embodiment, step 540 may include one or more of sub-steps 551-552, 554-555, and 557, followed by sub-step 559.

In sub-step 551, reconstruction module 44 reads, from the second PDB 54(Y), the PDB index 466(Y) of the second PDB 54(Y). Then, in sub-step 552, reconstruction module 44 calculates the PDB index 466(X) of the first PDB 54(X) by subtracting a distance of the second PDB 54(Y) from the first PDB 54(X) from the PDB index 466(Y) of the second PDB. In this case, either an exclusive distance is used or else the inclusive distance is used but 1 is added to the final result.

For example, with reference to FIG. 5, if the initial PDB 54(X) is 454(5) and the second PDB 54(Y) is 454(7), then the new PDB index 466(5) is calculated to be the PDB index 466(7) minus the inclusive distance plus 1. Since the inclusive distance is 3, the new PDB index 466(5) is 4−3+1=2.

Also with reference to FIG. 5, if the initial PDB 54(X) is 454(5) and the second PDB 54(Y) is 454(4), then the new PDB index 466(5) is calculated to be the PDB index 466(4)

minus the inclusive distance plus 1. Since the inclusive distance is zero, the new PDB index 466(5) is 1−0+1=2.

In sub-step 554, reconstruction module 44 reads, from the second PDB 54(Y), a value of a pointer (i.e., offset 157, 257) of an initial PD 56(Y)(I) of the second PDB 54(Y). Then, in sub-step 555, reconstruction module 44 calculates the value of a pointer 157, 257 of an initial PD 56(X)(I) of the first PDB 54(X) by: (i) determining an exclusive distance (i.e., the inclusive distance minus 1) of the second PDB 54(Y) from the first PDB 54(X); (ii) multiplying the exclusive distance by a maximum number of PDs 56 allowed per PDB 54 (e.g., a maximum of three), yielding a product; and (iii) subtracting the product from the value of the pointer 157, 257 of the initial PD 56(Y)(I) of the second PDB 54(Y).

For example, with reference to FIG. 2, if the initial PDB 54(X) is 154(1) and the second PDB 54(Y) is 154(3), then the exclusive distance is calculated to be the inclusive distance (i.e., 3) minus 1=2. 2 multiplied by the maximum number of 3 PDs 56 per PDB 54 yields a product of 6. Subtracting the product from the address 62(*a*)(7) of the offset 157 of PD 156(3)(I) yields a new offset 157 of initial PD 56(1)(I) of the first PDB 54(1) of 62(*a*)(1). Offsets 157 for the other PDs 56(1)(II), 56(1)(III) can be calculated by simple addition to be 62(*a*)(2), 62(*a*)(3), respectively.

Also with reference to FIG. 5, if the initial PDB 54(X) is 154(2) and the second PDB 54(Y) is 154(1), then the exclusive distance is calculated to be the inclusive distance (i.e., 0) minus 1=−1. −1 multiplied by the maximum number of 3 PDs 56 per PDB 54 yields a product of −3. Subtracting the product from the address 62(*a*)(1) of the offset 157 of PD 156(1)(I) yields a new offset 157 of initial PD 56(2)(I) of the first PDB 54(2) of 62(*a*)(1) minus −3=62(*a*)(4). Offsets 157 for the other PDs 56(2)(II), 56(2)(III) can be calculated by simple addition to be 62(*a*)(5), 62(*a*)(6), respectively.

In sub-step 557, reconstruction module 44 reads information from the header 253 of the second PDB 54(Y), including the version information 262, the total number 264, and the node association 268.

Then, in sub-step 559, reconstruction module 44 stored the results read and/or calculated in sub-steps 552, 555, and/or 557 in a reconstructed version of the first PDB 54(X).

It should be understood that, in some embodiments, step 550 may also involve additional sub-steps not depicted in FIG. 6. For example, once the offsets 157 of a PD 56 of the first PDB 54(X) has been reconstructed, reconstruction module 44 may issue a read on the page 60 at that offset 157, calculate a checksum of that page 60, and store that checksum as a reconstructed checksum 272 of that PD 56 of the first PDB 54(X). In addition, once all of the PDs 56 of the first PDB 54(X) as well as the rest of the data of the header 253 of the first PDB 54(X) (e.g., values 262, 264, 266, 268) have been reconstructed, reconstruction module 44 may calculate a checksum of the first PDB 54(X) and store that as a reconstructed checksum 270 of the header 253 of the first PDB 54(X).

Thus, techniques have been presented techniques for operating a storage system (e.g., 32(*a*)) to recover a corrupted data unit 54(X) in the organizational ring buffer 52 using redundancies present in other data units 54 of the same transaction 155. This may be accomplished by searching for another data unit 54(Y) within the organizational ring buffer 52 that contains sufficient information to allow the corrupted data unit 54(X) to be recovered and then reconstructing the corrupted data unit 54(X) using that other data unit 54(Y). It should be understood that although described in the context of a data storage system, such techniques can also be used in other contexts provided that a similarly-structured cache is in use.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method, performed by a computing device having memory, the method comprising:
   detecting corruption in a first page description block (PDB) of a plurality of PDBs stored in sequence in the memory, each PDB storing a set of page descriptors (PDs) that point to pages of data sequentially stored in the memory that are part of a single transaction, PDBs that represent the same transaction being contiguous within the sequence;
searching for a second PDB of the plurality of PDBs, the second PDB satisfying the following criteria:
(1) it is not corrupted, and
(2) it represents a same transaction as the first PDB; and
reconstructing the first PDB using the second PDB.

2. The method of claim 1 wherein searching includes, for a candidate PUB, determining whether it represents the same transaction as the first PDB based on (a) an index of the candidate PDB within its transaction and (b) a position within the sequence of the candidate PDB compared to the first PDB.

3. The method of claim 2 wherein the candidate PDB is located immediately prior to the first PDB, and determining whether it represents the same transaction as the first PDB includes:
reading, from the candidate PDB, (i) the index of the candidate PDB within its transaction and (ii) a total number of PDBs that represent its transaction; and
determining whether the total number exceeds the index.

4. The method of claim 2 wherein the candidate PDB is located subsequent to the first PDB, and determining whether it represents the same transaction as the first PDB includes:
reading, from the candidate PDB, the index of the candidate PDB within its transaction;
calculating a distance flow the first PDB to the candidate PDB, the distance being inclusive of endpoints; and
determining whether the distance is less than or equal to the index.

5. The method of claim 1 wherein reconstructing the first PDB using the second PDB includes:
reading an index of the second PDB within its transaction from the second PDB;
calculating an index of the first PDB within its transaction by subtracting a distance of the second PDB from the first PDB from the index of the second PDB within its transaction; and
storing the calculated index of the first PDB in a reconstruction of the first PDB.

6. The method of claim 1 wherein reconstructing the first PDB using the second PDB includes:
reading a value of a pointer of an initial PD of the second PDB from the second PDB;
calculating a value of a pointer of an initial PD of the first PDB by:
determining a distance of the second PDB from the first PDB;
multiplying the distance by a maximum number of PDs allowed per PDB, yielding a product; and
subtracting the product from the value of the pointer of the initial PD of the second PDB; and
storing the calculated value of the pointer of the initial PD of the first PDB in a reconstruction of the first PDB.

7. The method of claim 1 wherein reconstructing the first PDB using the second PDB includes:
reading header information from the second PDB; and
storing the read header information in a reconstruction of the first PDB.

8. The method of claim 1 wherein:
the memory of the computing device includes a non-volatile memory portion (NVMP) and a volatile system memory portion;
the plurality of PDBs are stored in sequence in the NVMP, each page of data pointed to by the PDs of the plurality of PDBs also being stored in the NVMP;
the method further comprises, in response to the computing device restarting, attempting to copy contents of the NVMP into the volatile system memory portion; and
detecting corruption in the first PDB is performed while attempting to copy contents of the NVMP into the volatile system memory portion.

9. The method of claim 8 wherein:
the computing device is a data storage apparatus (DSA) coupled to another DSA, each DSA being configured to perform data storage operations on a set of shared persistent storage, the DSA and the other DSA being configured to operate in an active-active arrangement, each transaction represented by the PDBs belonging to either the DSA or the other DSA, the NVMP being shared between the DSA and the other DSA;
the plurality of PDBs are stored within a first ring buffer of the NVMP shared between the DSA and the other DSA;
the NVMP includes a second ring buffer assigned to the DSA and a third ring buffer assigned to the other DSA; and
each page of data pointed to by the PDs of the plurality of PDBs is stored in one of the second ring buffer of the NVMP and the third ring buffer of the NVMP, based on whether the transaction represented by the PDB whose PDs point to that page belongs to the DSA or the other DSA, respectively.

10. An apparatus comprising:
memory; and
processing circuitry coupled to the memory, configured to:
detect corruption in a first page description block (PDB) of a plurality of PDBs stored in sequence in the memory, each PDB storing a set of page descriptors (PDs) that point to pages of data sequentially stored in the memory that are part of a single transaction, PDBs that represent the same transaction being contiguous within the sequence;
search for a second PDB of the plurality of PDBs, the second PDB satisfying the following criteria:
(1) it is not corrupted, and
(2) it represents a same transaction as the first PDB; and
reconstruct the first PDB using the second PDB.

11. The apparatus of claim 10 wherein searching includes, for a candidate PDB, determining whether it represents the same transaction as the first PDB based on (a) an index of the candidate PDB within its transaction and (b) a position within the sequence of the candidate PDB compared to the first PDB.

12. The apparatus of claim 11 wherein, when the candidate PDB is located immediately prior to the first PDB, determining whether it represents the same transaction as the first PDB includes:
reading, from the candidate PDB, (i) the index of the candidate PDB within its transaction and (ii) a total number of PDBs that represent its transaction; and
determining whether the total number exceeds the index.

13. The apparatus of claim 11 wherein, when the candidate PDB is located subsequent to the first PDB, determining whether it represents the same transaction as the first PDB includes:
reading, from the candidate PDB, the index of the candidate PDB within its transaction;

calculating a distance from the first PDB to the candidate PDB, the distance being inclusive of endpoints; and determining whether the distance is less than or equal to the index.

14. The apparatus of claim 10 wherein reconstructing the first PDB using the second PDB includes:

reading an index of the second PDB within its transaction from the second PDB;

calculating an index of the first PDB within its transaction by subtracting a distance of the second PDB from the first PDB from the index of the second PDB within its transaction; and storing the calculated index of the first PDB in a reconstruction of the first PDB.

15. The apparatus of claim 10 wherein reconstructing the first PDB using the second PDB includes:

reading a value of a pointer of an initial PD of the second PDB from the second PDB;

calculating a value of a pointer of an initial PD of the first PDB by:

determining a distance of the second PDB from the first PDB;

multiplying the distance by a maximum number of PDs allowed per PDB, yielding a product; and subtracting the product from the value of the pointer of the initial PD of the second PDB; and storing the calculated value of the pointer of the initial PD of the first PDB in a reconstruction of the first PDB.

16. The apparatus of claim 10 wherein reconstructing the first PDB using the second PDB includes:

reading header information from the second PDB; and storing the read header information in the first PDB.

17. The apparatus of claim 10 wherein:

the memory includes a non-volatile memory portion (NVMP) and a volatile system memory portion;

the plurality of PDBs are stored in sequence in the NVMP, each page of data pointed to by the PDs of the plurality of PDBs also being stored in the NVMP;

the processing circuitry coupled to the memory is further configured to, in response to the apparatus restarting, attempt to copy contents of the NVMP into the volatile system memory portion of the memory; and the processing circuitry coupled to the memory is configured to detect the corruption in the first PDB while attempting to copy contents of the NVMP into the volatile system memory portion.

18. The apparatus of claim 17 wherein:

the apparatus is a data storage appliance (DSA) coupled to another DSA, each DSA being configured to perform data storage operations on a set of shared persistent storage, the DSA and the other DSA being configured to operate in an active-active arrangement, each transaction represented by the PDBs belonging to either the DSA or the other DSA, the NVMP being shared between the DSA and the other DSA;

the plurality of PDBs are stored within a first ring buffer of the NVMP shared between the DSA and the other DSA;

the NVMP includes a second ring buffer assigned to the DSA and a third ring buffer assigned to the other DSA; and each page of data pointed to by the PDs of the plurality of PDBs is stored in one of the second ring buffer of the NVMP and the third ring buffer of the NVMP, based on whether the transaction represented by the PDB whose PDs point to that page belongs to the DSA or the other DSA, respectively.

19. A computer program product comprising a non-transitory computer-readable storage medium storing a set of instructions, which, when perform by a computer having memory, cause the computer to:

detect corruption in a first page description block (PDB) of a plurality of PDBs stored in sequence in the memory, each PDB storing a set of page descriptors (PDs) that point to pages of data sequentially stored in the memory that are part of a single transaction, PDBs that represent the same transaction being contiguous within the sequence;

search for a second PDB of the plurality of PDBs, the second PDB satisfying the following criteria:

(1) it is not corrupted, and (2) it represents a same transaction as the first PDB; and reconstruct the first PDB using the second PDB.

20. The computer program product of claim 19 wherein searching includes, for a candidate PDB, determining whether it represents the same transaction as the first PDB based on (a) an index of the candidate PDB within its transaction and (b) a position within the sequence of the candidate PDB compared to the first PDB.

* * * * *

UNITED STATES PATENT AND TRADEMARK OFFICE
CERTIFICATE OF CORRECTION

| | |
|---|---|
| PATENT NO. | : 11,269,746 B1 |
| APPLICATION NO. | : 17/156030 |
| DATED | : March 8, 2022 |
| INVENTOR(S) | : Edward Zhao et al. |

It is certified that error appears in the above-identified patent and that said Letters Patent is hereby corrected as shown below:

In the Claims

In Column 11, Claim 2, Line 2 please change "PUB" to --PDB--.

Signed and Sealed this
Fifteenth Day of November, 2022

Katherine Kelly Vidal
*Director of the United States Patent and Trademark Office*